United States Patent
Jöckel et al.

(10) Patent No.: US 7,948,134 B2
(45) Date of Patent: May 24, 2011

(54) PM ROTOR HAVING RADIAL COOLING SLOTS AND CORRESPONDING PRODUCTION METHOD

(75) Inventors: Andreas Jöckel, Nürnberg (DE); Thomas Schmidt, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/520,716

(22) PCT Filed: Dec. 19, 2007

(86) PCT No.: PCT/EP2007/064197
§ 371 (c)(1),
(2), (4) Date: Jun. 22, 2009

(87) PCT Pub. No.: WO2008/077855
PCT Pub. Date: Jul. 3, 2008

(65) Prior Publication Data
US 2009/0289517 A1 Nov. 26, 2009

(30) Foreign Application Priority Data

Dec. 22, 2006 (DE) .......................... 10 2006 061 372

(51) Int. Cl.
*H02K 21/12* (2006.01)
(52) U.S. Cl. ............................. 310/156.23; 310/156.31
(58) Field of Classification Search ............ 310/156.23, 310/156.27, 156.31, 156.57, 156.53, 156.56
See application file for complete search history.

(56) References Cited

U.S. PATENT DOCUMENTS

| 4,394,594 A * | 7/1983 | Schmider et al. ............ 310/68 R |
| 4,678,954 A | 7/1987 | Gokyu et al. |
| 6,384,498 B1 * | 5/2002 | Yamaguchi et al. ............ 310/81 |
| 6,445,100 B2 * | 9/2002 | Tajima et al. ............ 310/156.57 |
| 2006/0071568 A1 | 4/2006 | Tetsuo et al. |

FOREIGN PATENT DOCUMENTS

| DE | 544 934 C | 7/1952 |
| DE | 690 07 244 T2 | 6/1994 |
| DE | 44 42 869 C2 | 7/1997 |
| DE | 102 36 609 A1 | 1/2004 |
| DE | 10 2004 031 329 A1 | 1/2006 |
| EP | 0 887 911 A1 | 12/1998 |
| JP | 60 234450 A | 11/1985 |
| JP | 92 15235 A | 8/1997 |
| JP | 2006/230093 A | 8/2006 |
| WO | WO 2005/117235 A1 | 12/2005 |

* cited by examiner

*Primary Examiner* — Dang D Le
(74) *Attorney, Agent, or Firm* — Henry M. Feiereisen; Ursula B. Day

(57) ABSTRACT

A permanent magnet (PM) rotor has a plurality of partial laminated stacks that are interspaced in the axial direction at a defined distance, thereby defining radial cooling slots. Permanent magnets are arranged in every partial laminated stack in inner pockets. The dimension of every permanent magnet in the axial direction does not or only insignificantly exceed the axial dimensions of the respective partial laminated stack. During assembly, the permanent magnets can be axially pushed through the inner pockets to the respective partial laminated stack (20). The rotor has a very high degree of efficiency.

5 Claims, 2 Drawing Sheets

PM ROTOR HAVING RADIAL COOLING SLOTS AND CORRESPONDING PRODUCTION METHOD

CROSS-REFERENCES TO RELATED APPLICATIONS

This application is the U.S. National Stage of International Application No. PCT/EP2007/064197, filed Dec. 19, 2007, which designated the United States and has been published as International Publication No. WO 2008/077855 and which claims the priority of German Patent Application, Serial No. 10 2006 061 372.4, filed Dec. 22, 2006, pursuant to 35 U.S.C. 119(a)-(d).

BACKGROUND OF THE INVENTION

The present invention relates to a rotor of an electrical machine having a plurality of partial laminated cores which are each at a defined distance from one another in the axial direction, such that radial cooling slots are formed. The present invention furthermore relates to a method for production of a rotor such as this. These rotors may be used in a motor, or else in particular in a generator.

High-speed wind power generators are nowadays, without exception, sliping-rotor machines with radial cooling slots. One such machine is illustrated in the form of a partially sectioned view in FIG. 1. The generator 1 has a rotor 2 with an axially segmented laminated core. Individual partial laminated cores 3 are joined together on a shaft 4 to form the overall laminated core. The individual partial laminated cores 3 are separated from one another in a defined manner, thus resulting in radially formed cooling slots 5.

At the end opposite the drive end, the shaft 4 is fitted with a slipring unit 6, in order to tap off the generated current. The associated sliprings 7 and the three double brushes 8 can be seen in FIG. 1.

For cooling, the stator 9 of the generator 1 is also provided with radial cooling slots. The heat is dissipated from the generator 1 by means of an air-air heat exchanger 10. This blows external cooling air 11 in the axial direction of the generator 1 through cooling rods 12 in the interior of the heat exchanger 10. The cooling air in the interior of the cooling rods 12 absorbs the heat of the generator 1 and transports it at the other end out of the heat exchanger 10, as is shown by heated exhaust air 13 in FIG. 1.

Together with the interior of the air-air heat exchanger 10, the interior of the generator 1 is used for a closed cooling circuit 14. Corresponding to this closed cooling circuit, cool air is blown axially into the laminated rotor core. The cooling air flows through the radial cooling slots in the rotor 2 and in the stator 9, and is heated in the process. The heated air flows into the heat exchanger 10, and is cooled down on the cooling tubes 12. It is then passed to the rotor 2 again. The closed cooling circuit makes it possible to avoid the generator from being contaminated, for example, by dust, salt water etc.

Furthermore, PM machines (permanent-magnet machines) with internal magnets are also known. The permanent magnets are in this case located underneath the envelope surface of the laminated rotor core, in pockets provided specifically for this purpose. The permanent magnets can be pushed axially into the respective pockets during assembly. Effective cooling of the rotor in these PM machines is problematic.

SUMMARY OF THE INVENTION

The object of the present invention is therefore to propose a rotor of simple design for an electrical machine, which can be cooled with high efficiency.

The invention therefore provides a rotor of an electrical machine having a plurality of partial laminated cores which are each at a defined distance from one another in the axial direction, such that radial cooling slots are formed, and permanent magnets, which are arranged in internal pockets in each of the partial laminated cores, with the size of each permanent magnet in the axial direction not exceeding or only insignificantly exceeding the axial size of the respective partial laminated core.

Furthermore, according to the invention, a method is provided for production of a rotor by fitting of the plurality of partial laminated cores at the respectively defined distance from one another, and insertion of the permanent magnets for a first of the partial laminated cores in the axial direction into the first partial laminated core, through the internal pockets in a second of the partial laminated cores.

The present cooling-concept technology can advantageously be retained for the rotor according to the invention. The air flow rate used for cooling and the flow resistance are therefore virtually unchanged in comparison to the known machine illustrated in FIG. 1. The stator design can also be transferred from the known machine, as a result of which the losses and manufacturing technology are known. The high cooling efficiency, the high electrical efficiency, the high magnetic flux and the secure attachment of the magnets may be mentioned as further advantages of the rotor according to the invention with the internal permanent magnets and the radial cooling slots.

The permanent magnets advantageously have the same axial size as the associated partial laminated core. The permanent magnets therefore do not project into the radial cooling slots, which extend in the form of disks, radially externally around the shaft of the rotor. They therefore do not impede the radially running cooling flow.

A plurality of permanent magnets may be used for each pole in the circumferential direction. This makes it possible to increase the magnetic flux, if necessary.

Furthermore, the permanent magnets in the pockets can be encapsulated with resin. They are therefore permanently fixed in the pockets.

Specifically, the permanent magnets in their pockets can be embedded with a non-woven. Preformed boxes composed of compressible non-woven material are particularly suitable for this purpose. Alternatively, however, a non-woven strip can also be introduced in the circumferential direction, at the side alongside a permanent magnet, between the permanent magnet and an inner wall of the respective pocket. These non-woven strips then, in particular, ensure fixing in the circumferential direction. The non-woven material can be impregnated with the resin thus allowing the resin to be held better in the gaps between the permanent magnet and the laminated core.

During the manufacture of the rotor mentioned above, the permanent magnets can slide by means of their own magnetic force into the respective final fitted position in the associated pocket. The permanent magnets therefore adjust themselves while being fitted within the partial laminated cores such that they do not project into the radial cooling slots.

BRIEF DESCRIPTION OF THE DRAWING

The present invention will be explained in more detail with reference to the attached drawings, in which.

DETAILED DESCRIPTION OF PREFERRED EMBODIMENTS

The exemplary embodiments described in more detail in the following text represent preferred embodiments of the present invention.

Corresponding to the fundamental idea of the present invention, a rotor having internal permanent magnets is proposed, which has radial cooling slots. The following requirements must be observed for a combination such as this of internal magnets and radial cooling slots:

when fitting the magnets, it must be possible to push the magnets, which are to be inserted axially from the outside, through the partial laminated cores of the rotor, beyond the cooling slots, into their position.

within the respective partial laminated cores, the magnets must remain "hanging" in a centered manner until the encapsulating resin finally fixes them.

during operation, the magnets and the resin must remain secure within the partial laminated core.

the magnet plates must neither become loose as an entity nor may parts of them break off and migrate through the radial cooling slot into the air-gap area (risk of winding destruction).

during encapsulation (advantageously immersion impregnation), the resin must run out of the radial cooling slots again but must remain in the tenth-gaps between the magnet and the partial laminated core by virtue of the capillary effect, and must cure there.

Figure 1:
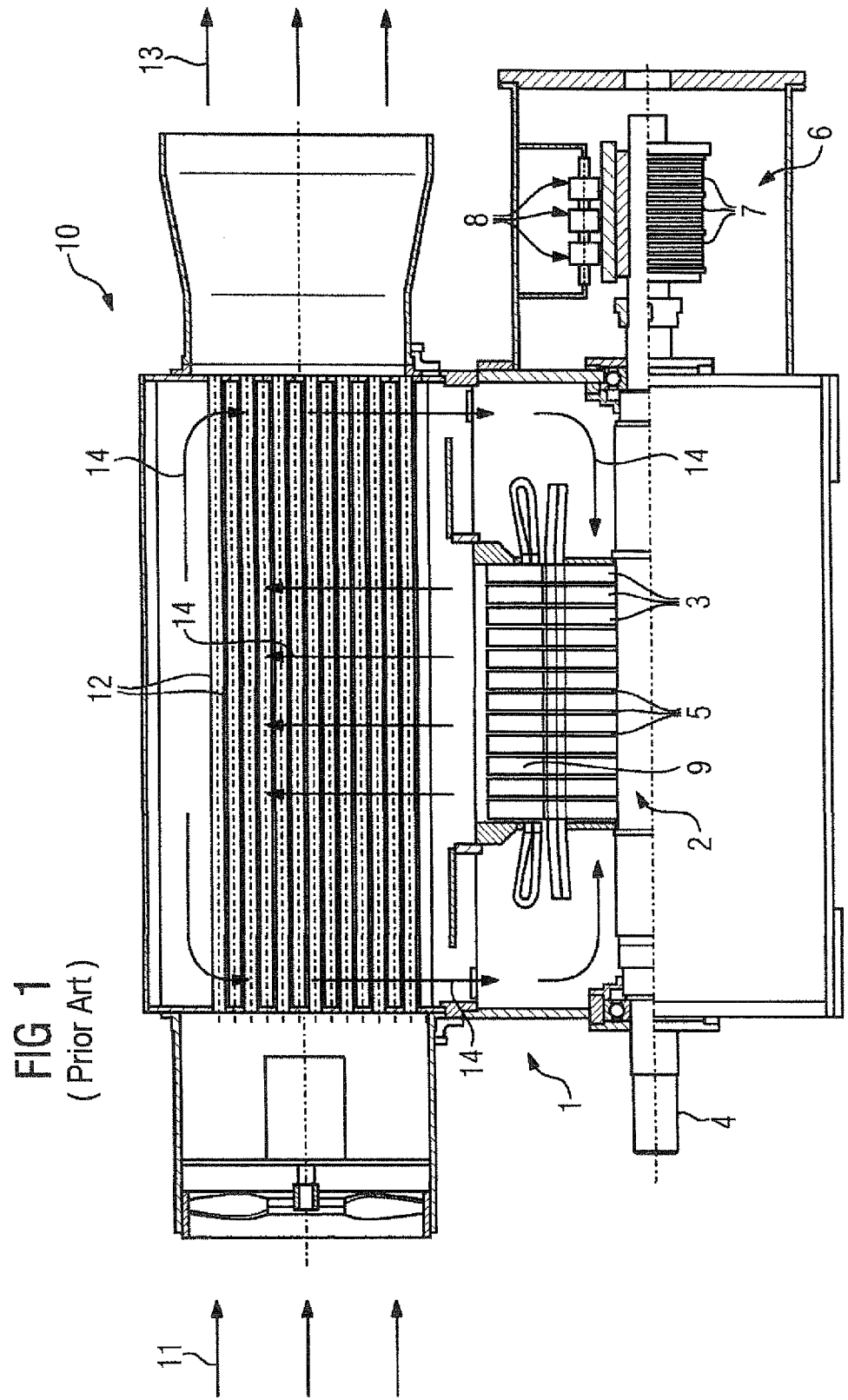
FIG. 1 shows a partial cross-sectional view of a generator having an air-air heat exchanger according to the prior art.
Figure 2:
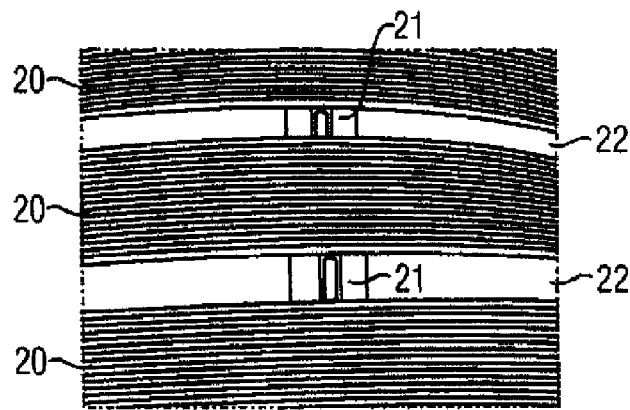
FIG. 2 shows a plan view of a rotor with radial cooling slots.

In order to comply with these requirements, a rotor is formed from a plurality of partial laminated cores 20, as shown in FIG. 2. The partial laminated cores are separated from one another axially with the aid of appropriate webs 21. This results in radial cooling slots 22, which are in the form of disks.

Figure 3:
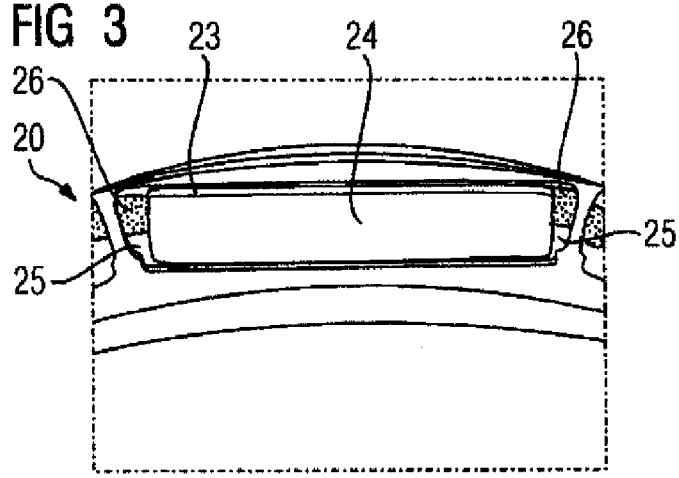
FIG. 3 shows an end-face view of a partial laminated core with internal permanent magnets.

FIG. 3 shows the end-face view of one of these partial laminated cores 20, in the form of a detail. The FIG. shows that a pocket 23 for a permanent magnet 24 is provided underneath the envelope surface of the partial laminated core 20. The PM rotor and each of its partial laminated cores 20 are therefore equipped with internal permanent magnets 24, that is to say not surface magnets.

One or more permanent magnets may be provided for each pole in the circumferential direction. In some circumstances, the use of a plurality of permanent magnets for each pole makes it possible to increase the magnetic flux.

In the axial direction, the magnet plate or the magnet 24 is of exactly the same length as the partial laminated core 20. If required, a plurality of permanent magnets are arranged one behind the other in the axial direction in one pocket 23, and together have the same axial size as the partial laminated core. In any case, this ensures that the magnet or magnets does or do not project into the radial ventilation slot 22.

During manufacture, the magnets 24 are pushed into the pockets 23 axially from one side or from two sides (in the case of a staggered rotor). For the axially internal partial laminated cores, the magnets are pushed in a corresponding manner through the pockets of one or more partial laminated cores. During insertion, the magnets slide beyond the cooling slots and are always centered accurately in the partial laminated cores, by virtue of the magnetic forces. Thus, when the rotor is being fitted with permanent magnets, the property of the permanent magnets is used in such a way that, in order to minimize their magnetic potential energy, they always wish to be surrounded by iron or some other soft-magnetic material. Since the magnets are axially of precisely the same length as the corresponding partial laminated core (for example 50 mm) and are somewhat longer than the axial width of the cooling slots 22, this means that they can be pushed beyond the cooling slot when inserted axially, but then remain hanging in a centered manner in the respective partial laminated core. This not only allows magnets to be fitted in a simple manner but also provides the basis during operation for the magnets to remain securely in the partial laminated core.

However, for safety reasons, the magnets are additionally fixed, for example, by resin in the pockets 23. Corresponding to a first embodiment, the rotor is for this purpose immersed in the resin, in the same way as a slipring rotor. After being drawn out, the resin runs out of the large slots again and thus releases the air slots and cooling slots. In contrast, the resin remains hanging in the tenth gaps between the magnet and laminate and is then cured in a rotating manner. This embodiment is not illustrated in the figures.

Corresponding to a second embodiment, which is illustrated in FIG. 3, the magnet pockets 23 each have side cutouts 25, through which a continuous non-woven strip 26 is pushed in each case, before the resin impregnation. Finally, the entire rotor is impregnated with resin. This can be done either by immersion, rolling or a VPI process. In this case, the non-woven strips bind the resin and ensure fixed side contact and fixing of the magnet plate in the interior of the respective partial laminated core. The non-woven strips 26 swell during impregnation outside the partial laminated core 20, that is to say in the cooling slot 22, and axially fix the magnet plate 24 by means of an interlock after curing.

Figure 4:
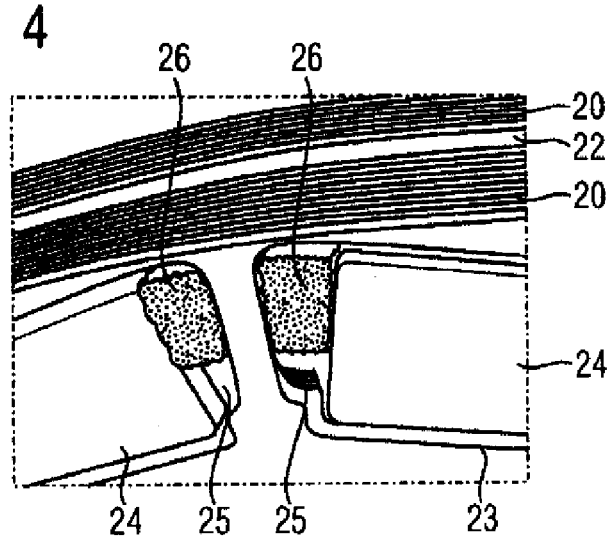
FIG. 4 shows a detail from FIG. 2.

This projection of the non-woven strip 26 out of the partial laminated core 20 can be seen well in the enlarged section that is illustrated in FIG. 4.

According to a third embodiment, the magnet pockets can be provided with preformed boxes composed of compressible non-woven material for simpler insertion and better adhesion of the resin during operation. In order to ensure that the boxes are dimensionally stable, they are composed of a solid material on the outside, By way of example, a VVL non-woven may be used as the non-woven material.

The present invention therefore makes it possible to combine the two fundamental design principles of "active part with radial cooling slots" and "permanent magnets located internally in the laminated rotor core". This is also fundamentally important for use of the PM rotor in very large "modular" machines or wind power generators. In addition, this results in the following advantages, which in some cases have already been mentioned:

the traditional cooling principle for large air-cooled machines (x-ventilation, z-ventilation) can be retained.

the cold cooling air is first of all passed through the PM rotor. This results not only in a "cold" rotor but also in secure magnet fixing, a high magnetic flux and high efficiency.

the resin impregnation method (immersion and rotating curing) of the PM rotor can be transferred completely from slipring rotors.

a resin encapsulation process with the rotor positioned vertically can be avoided.

very good ventilation of the stator can be ensured since, in comparison to the asynchronous rotor, more air can be passed through the cooling slots, because there are no copper coils or rods located in the flow.

finally, very good cooling of the stator can also be ensured since, in comparison to an asynchronous rotor, the air comes out of the rotor very cold, because the PM rotor has only relatively low losses.

An electrical machine such as this having a rotor according to the invention is particularly suitable as a generator for wind power installations, and as an electrical machine of modular design for industrial use.

Cooling modules with x ventilation or z ventilation are particularly suitable for modular design.

What is claimed is:

1. A rotor of an electrical machine comprising:
   a plurality of partial laminated cores, which have an axial length and are spaced apart in an axial direction by a defined gap spacing, said gap spacing forming radial cooling slots, and
   a plurality of permanent magnets, each permanent magnet embedded in a corresponding interior pocket of an associated partial laminated core with a non-woven fabric and encapsulated with resin, with an axial length of each permanent magnet not exceeding or only insignificantly exceeding the axial length of the associated partial laminated core,
   wherein the interior pocket has an axially extending inner wall and the non-woven fabric is implemented as non-woven axially extending strip, with different strips sequentially arranged in a circumferential direction, wherein each strip is disposed in a gap formed between a permanent magnet and the inner wall of a respective pocket.

2. The rotor of claim 1, wherein the axial length of the permanent magnets is identical to the axial length of the associated partial laminated core.

3. The rotor of claim 1, wherein each rotor pole comprises several permanent magnets sequentially arranged in a circumferential direction.

4. An electrical machine, comprising a rotor including
   a plurality of partial laminated cores, which have an axial length and are spaced apart in an axial direction by a defined gap spacing, said gap spacing forming radial cooling slots, and
   a plurality of permanent magnets, each permanent magnet embedded in a corresponding interior pocket of an associated partial laminated core with a non-woven fabric and encapsulated with resin, with an axial length of each permanent magnet not exceeding or only insignificantly exceeding the axial length of the associated partial laminated core,
   wherein the interior pocket has an axially extending inner wall and the non-woven fabric is implemented as non-woven axially extending strip, with different strips sequentially arranged in a circumferential direction, wherein each strip is disposed in a gap formed between a permanent magnet and the inner wall of a respective pocket.

5. The electrical machine of claim 4 for use in a wind power installation or a modular industrial drive.

* * * * *

UNITED STATES PATENT AND TRADEMARK OFFICE
CERTIFICATE OF CORRECTION

| | | |
|---|---|---|
| PATENT NO. | : 7,948,134 B2 | Page 1 of 1 |
| APPLICATION NO. | : 12/520716 | |
| DATED | : May 24, 2011 | |
| INVENTOR(S) | : Andreas Jöckel and Thomas Schmidt | |

It is certified that error appears in the above-identified patent and that said Letters Patent is hereby corrected as shown below:

Title Page;

[56] References Cited, FOREIGN PATENT DOCUMENTS, column 2:

replace "DE 544 934 C" with --DE 844 934 C--.

Signed and Sealed this
Twenty-sixth Day of July, 2011

David J. Kappos
*Director of the United States Patent and Trademark Office*